United States Patent [10] Patent No.: US 10,073,504 B2
Nakanishi et al. (45) Date of Patent: Sep. 11, 2018

(54) OPTIMIZATION OF FAN CONTROL FOR STORAGE DEVICE

(71) Applicant: HITACHI, LTD., Tokyo (JP)

(72) Inventors: Hidechika Nakanishi, Tokyo (JP); Masateru Yokoyama, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 204 days.

(21) Appl. No.: 15/121,784

(22) PCT Filed: Jul. 28, 2014

(86) PCT No.: PCT/JP2014/069807
§ 371 (c)(1),
(2) Date: Aug. 26, 2016

(87) PCT Pub. No.: WO2016/016925
PCT Pub. Date: Feb. 4, 2016

(65) Prior Publication Data
US 2017/0017280 A1    Jan. 19, 2017

(51) Int. Cl.
*G05B 15/02* (2006.01)
*G06F 1/20* (2006.01)
*G11B 33/14* (2006.01)

(52) U.S. Cl.
CPC ............. *G06F 1/206* (2013.01); *G05B 15/02* (2013.01); *G06F 1/20* (2013.01); *G11B 33/142* (2013.01); *G11B 33/144* (2013.01)

(58) Field of Classification Search
None
See application file for complete search history.

(56) References Cited

U.S. PATENT DOCUMENTS 5,485,446 A * 1/1996 Uno ............... G11B 33/08
                                                    360/99.18
6,428,282 B1 * 8/2002 Langley ............ F04D 27/004
                                                    417/2
(Continued)

FOREIGN PATENT DOCUMENTS

JP         04-275095 A    9/1992
JP      2009-157784 A    7/2009
(Continued)

OTHER PUBLICATIONS

International Search Report of PCT/JP2014/069807 dated Oct. 7, 2014.

*Primary Examiner* — Isaac T Tecklu
(74) *Attorney, Agent, or Firm* — Mattingly & Malur, PC

(57) ABSTRACT

The present invention provides a storage subsystem capable of preventing abnormal temperature rise within the subsystem and realizing an efficient cooling effect. Therefore, the storage subsystem has two or more controllers having two or more temperature sensors, and each controller determines a provisional rotational speed based on the value of the temperature sensors. One controller out of the multiple controllers operates as the master controller, and the other controllers (slave controllers) transmit a provisional rotational speed determined in its own system to the master controller. The master controller determines a greater value of the provisional rotational speed information received from the slave controllers and the provisional rotational speed determined in its own system as the final rotational speed of the fan.

7 Claims, 6 Drawing Sheets

(56) References Cited

U.S. PATENT DOCUMENTS

| | | | | |
|---|---|---|---|---|
| 8,265,799 B2* | 9/2012 | Eto | ............... | G06F 1/206 361/679.54 |
| 8,892,389 B1* | 11/2014 | Muller | ............... | G06F 11/3003 361/690 |
| 2003/0201741 A1* | 10/2003 | Lee | ............... | G06F 1/206 318/268 |
| 2006/0232914 A1* | 10/2006 | Hori | ............... | G06F 1/20 361/676 |
| 2009/0171473 A1* | 7/2009 | Matsuda | ............... | G05B 15/02 700/3 |
| 2010/0118484 A1* | 5/2010 | Sasagawa | ............... | G06F 1/20 361/679.37 |
| 2011/0029151 A1* | 2/2011 | Tang | ............... | G05D 23/1917 700/300 |
| 2011/0295524 A1* | 12/2011 | Tada | ............... | H05K 7/20181 702/45 |
| 2012/0113582 A1* | 5/2012 | Hirano | ............... | G06F 1/187 361/679.33 |
| 2012/0143389 A1* | 6/2012 | Wang | ............... | G05D 23/1934 700/300 |
| 2013/0229765 A1* | 9/2013 | Weng | ............... | G06F 1/206 361/679.33 |
| 2013/0258521 A1* | 10/2013 | Yang | ............... | G11B 33/144 360/97.13 |
| 2014/0104784 A1* | 4/2014 | Chen | ............... | G06F 1/206 361/679.47 |
| 2015/0062815 A1* | 3/2015 | Nomura | ............... | H05K 7/20209 361/695 |
| 2015/0106644 A1* | 4/2015 | Lin | ............... | G06F 11/3062 713/340 |
| 2016/0282807 A1* | 9/2016 | Kinoshita | ............... | G03G 21/206 |
| 2017/0202111 A1* | 7/2017 | Huang | ............... | H05K 7/1489 |

FOREIGN PATENT DOCUMENTS

| | | |
|---|---|---|
| JP | 2011-138232 A | 7/2011 |
| JP | 2014-072411 A | 4/2014 |

* cited by examiner

Fig. 1
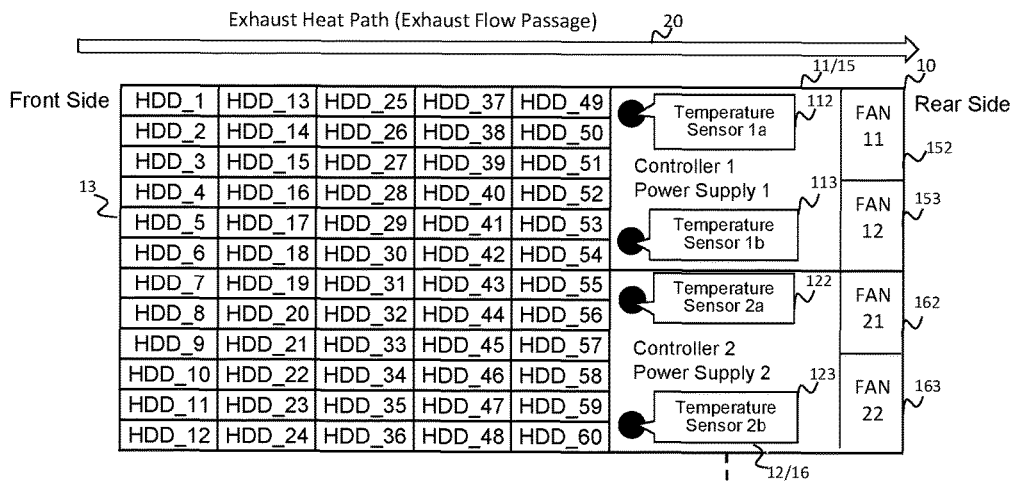
(1) External Upper View
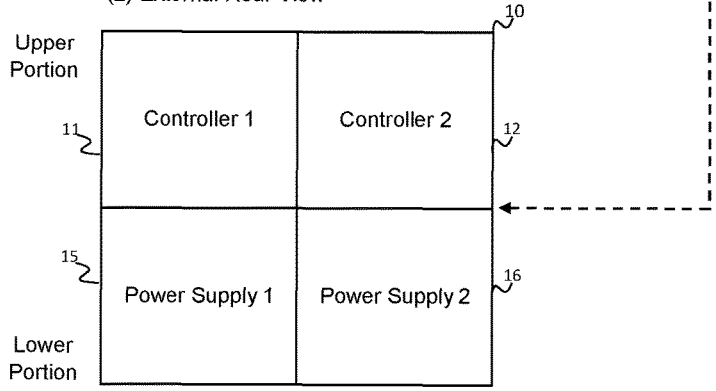
(2) External Rear View

Fig. 3
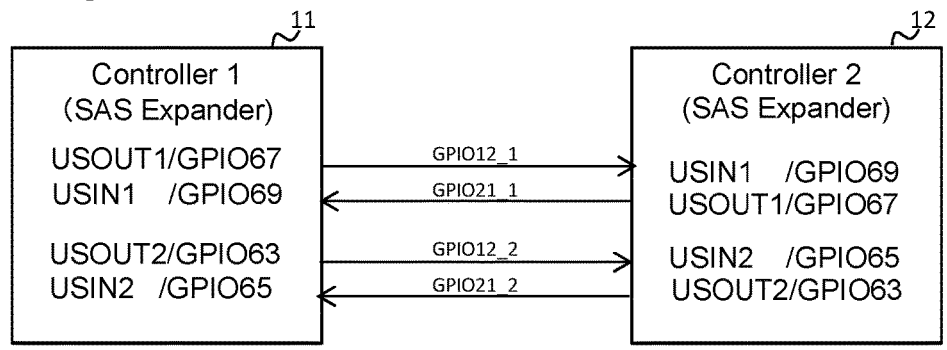
Fig. 4
| # | Speed Setting | Memory Setting Value | Remarks |
|---|---|---|---|
| 1 | Speed1 | 0x80 | - |
| 2 | Speed2 | 0x9C | - |
| 3 | Speed3 | 0xBA | - |
| 4 | Speed4(MAX) | 0xD9 | Use only during abnormality |
Fig. 5
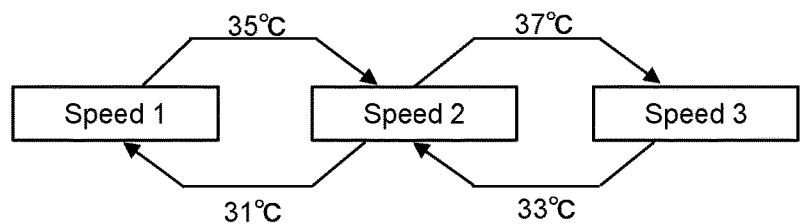

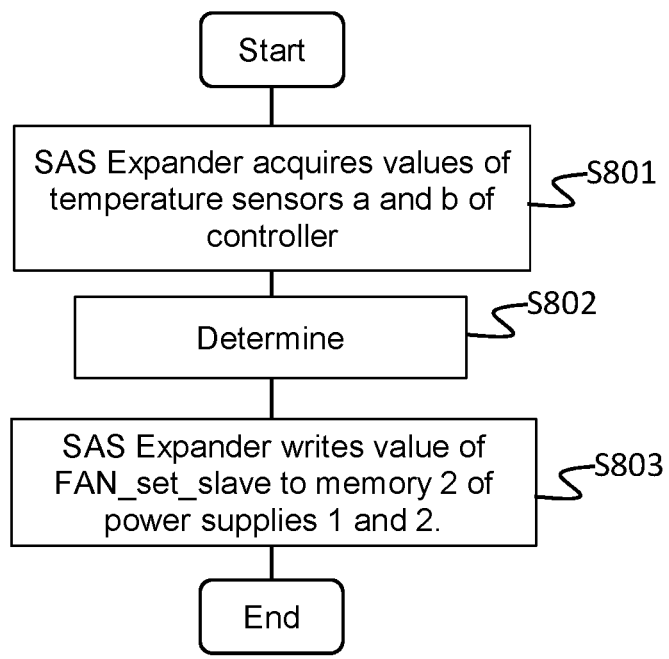

OPTIMIZATION OF FAN CONTROL FOR STORAGE DEVICE

TECHNICAL FIELD

The present invention relates to optimization of FAN control of storage subsystems.

BACKGROUND ART

In a storage subsystem using multiple storage devices and operated in a RAID (Redundant Array of Independent (Inexpensive) Disks) configuration, a structure is adopted where two or more control modules are installed to constantly realize redundancy. Further, as taught in Patent Literature 1, cooling fans are provided in the configuration to discharge the heat generated from devices disposed inside the storage subsystem. Similar to the control module, multiple cooling fans are installed to realize redundancy. It is preferable that the output of the cooling fans are changed according to the heat quantity.

The technique taught in Patent Literature 1 teaches a configuration where a hardware fan control unit for controlling the cooling fans via hardware is provided in a PLD (Programmable Logical Device), and the control of the cooling fans is performed until cooling fan control becomes possible using firmware. At this time, controller modules notify each other of the status of installation of modules, and all the cooling fans are controlled collectively by a controller module having the smallest ID of the IDs indicated by a combination of signals showing the status of installation thereof.

CITATION LIST

Patent Literature

[PTL 1] United States Patent Application Publication No. 2009/0171473 (Japanese Patent Application Laid-Open No. 2009-157784)

SUMMARY OF INVENTION

Technical Problem

The temperature inside the storage subsystem may vary at respective positions within the subsystem according to the state of installation of the HDDs (Hard Disk Drives) or the SSDs (Solid State Drives). Therefore, it is necessary to synchronize and control the cooling fans according to the temperature information of the position where the temperature within the subsystem is highest. However, Patent Literature 1 merely teaches providing a monitor unit for monitoring the temperature within the chassis of the storage system, but lacks to teach the specific configuration of the monitor unit, and also lacks to teach a method to cope with the state where the temperature differs at various positions within the subsystem.

Solution to Problem

In order to solve the problems described above, the storage subsystem according to the present invention has two or more controllers having two or more temperature sensors, wherein each controller determines a first rotational speed of fan (hereinafter referred to as provisional rotational speed). One controller out of the multiple controllers operates as a master controller, and the other controllers (slave controllers) transmit the provisional rotational speed information determined in its own system to the master controller. The master controller compares the provisional rotational speed information received from the slave controllers and the provisional rotational speed information determined in its own system, and determines the greatest value as the final rotational speed of the fan.

Advantageous Effects of Invention

According to the storage subsystem of the present invention, it becomes possible to prevent abnormal temperature rise within the storage subsystem, realize efficient cooling, and suppress noise and power consumption to a minimum. The problems, configurations and effects other than those described above will become apparent by the detailed description of preferred embodiments described hereafter.

BRIEF DESCRIPTION OF DRAWINGS

FIG. 1 is a view showing a structure of a storage subsystem and an exhaust flow passage.

FIG. 3 is a view illustrating the I/F between controllers.

FIG. 4 is a view illustrating a configuration example of a fan rotation speed determination table.

FIG. 5 is a view illustrating a state transition of the fan rotation speed (rotational speed).

FIG. 8 is a flowchart illustrating a process of acquiring temperature information by the slave controller.

DESCRIPTION OF EMBODIMENTS

Figure 2:
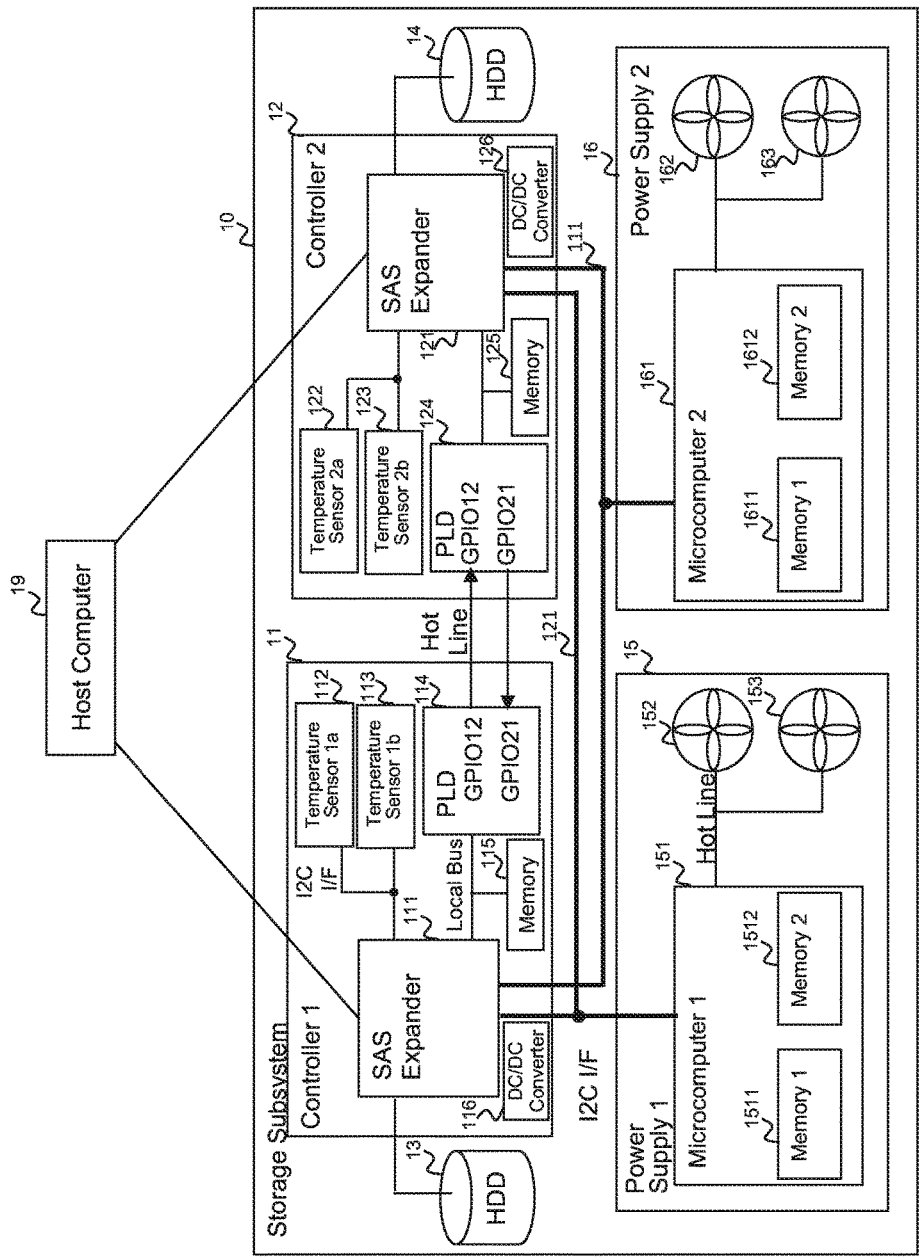
FIG. 2 is a view illustrating a hardware configuration of a storage subsystem.

Now, the preferred embodiments of the present invention will be described with reference to the drawings. In the following description, various information are referred to as "management tables", for example, but the various information can also be expressed by data structures other than tables. Further, the "management table" can also be referred to as "management information" to indicate that the information does not depend on the data structure.

The processes are sometimes described using the term "program" as the subject. The program is executed by a processor, such as an MP (Micro Processor) or a CPU (Central Processing Unit), for performing determined processes. A processor can also be the subject of the processes since the processes are performed by a processor using appropriate storage resources (such as memories) and communication interface devices (such as communication ports). The processor can also use dedicated hardware in addition to the CPU. The computer programs can be installed to each computer from a program source. The program source can be provided via a program assignment server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one, unless defined otherwise.

<Structure of Storage Subsystem and Exhaust Flow Passage>

FIG. 1 is a view illustrating a structure of a storage subsystem and an exhaust flow passage. A storage subsystem 10 has two controllers 1 11/controller 1 12, power supply 1 15/power supply 2 116, a drive unit 13 storing multiple HDDs and SSDs, and cooling fan 11 152/cooling fan 12 153/cooling fan 21 162/cooling fan 22 163 for discharging the heat generated within the storage subsystem to an exterior of the subsystem and cooling the respective devices.

HDDs and SSDs are installed in a drive canister, and the drive canister is inserted from an upper portion of the storage subsystem 10 to a slot on a baseboard (not shown) of the drive unit 13 (capable of having 60 canisters inserted thereto, for example). Therefore, a configuration is adopted where a given number of HDDs and SSDs can be mounted and connected highly densely to the storage subsystem 10. The inserting and removing of the drive canister can be performed while the storage subsystem 10 is operated.

FIG. 1 illustrates an example where all the HDDs and SSDs are mounted to the drive unit 13, but there may also be cases where a portion of the drive canisters (such as HDD_39) are removed for maintenance and the like, or where only a number of drive canisters corresponding to the necessary storage capacity of the subsystem are mounted and the unused slots are used for expansion (such as those corresponding to one row which is parallel to the heat exhaust passage 18 (five HDDs, HDD_6/18/30/42/54 and five HDDs, HDD_12/24/36/48/60, or five SSDs)). In this case, when air is taken in by the cooling fan 11 152 and the like, an exhaust heat path 20 is formed from a front side (where HDDs and SSDs are installed) to a rear side (where cooling fans are arranged), but there occurs a problem in that resistance of intake air is increased in a space where the drive canister is not installed, and turbulence such as Karman vortex may easily occur, so that efficient removal of heat from the surface of the drive canister facing this space becomes difficult.

Thus, according to the present embodiment, the rotational speed of the cooling fan 11 152 and the like is increased so that the amount of intake air from the front side of the storage subsystem 10 is increased, by which the cooling efficiency of the HDD (or SSD), the controller and the power supply is improved, and abnormal increase of temperature is prevented. Therefore, two or more temperature sensors are provided for one controller. For example, a temperature sensor 1a 112 and a temperature sensor 1b 113 are provided to the controller 1 11, and a temperature sensor 2a 122 and a temperature sensor 2b 123 are provided to the controller 2 12.

The power supply 1 15 for supplying power to the controller 1 11 and the drive unit 13 is provided below the controller 1 11. Similarly, the power supply 1 16 for supplying power to the controller 2 12 and the drive unit 13 is provided below the controller 2 12. These HDDs (or SSDs), controllers and power supplies are arranged so that cooling fans 11 152 through 22 163 disposed on the rear side of the storage subsystem 10 rotate so as to intake the air from the front side of the storage subsystem 10 and to send cooling wind toward the respective devices, by which the heat generated by the respective devices can be taken in and discharged from the rear side of the storage subsystem 10.

<Hardware Configuration of Storage Subsystem>

FIG. 2 is a view illustrating a hardware configuration of the storage subsystem. As described earlier, the storage subsystem 10 is provided with the controller 1 11 for communicating with a host computer 19 and the drive unit 13, and the power supply 1 15 for supplying power to the controller 1 11 and the drive unit 13. Further, the storage subsystem 10 is provided with the controller 2 12 for communicating with the host computer 19 and the drive unit 14, and the power supply 2 16 for supplying power to the controller 2 12 and the drive unit 14.

The controller 1 11 includes a SAS-Expander controller (hereinafter referred to as SAS controller) 111 for controlling the communication with the host computer 19 and the drive unit 13, and the temperature sensor 1a 112 and the temperature sensor 1b 113 for acquiring temperature information and transmitting the same to the SAS controller 111 using a serial communication I/F (such as I2C (Registered Trademark)-I/F). The controller 1 11 further includes a PLD 114 for performing emergency communication (such as I2C-I/F) with the controller 2 12, a memory 115 for storing various information such as temperature information and tables, and a DC/DC converter 116 for converting DC voltage from the power supply 1 15 to a given voltage (such as 3.3 V, 5 V, 12 V and so on).

The power supply 1 15 is provided with a microcontroller 1 151 for controlling the whole power supply (hereinafter referred to as microcontroller), and the cooling fan 152 and the cooling fan 153 having their rotational speed controlled by the microcontroller 1 151 so as to cool the interior of the storage subsystem 10. In the interior of the microcontroller 1 151 are provided a memory 1 1511 for setting the rotation speed of the cooling fan 11 152 and the cooling fan 12 153, and a memory 2 1512 for storing the two temperature information acquired from the temperature sensor 1a 112 and the temperature sensor 1b 113. It is also possible to have the rotation speed of the cooling fan 11 152 and the cooling fan 12 153 set to the memory 2 1512.

The controller 2 12 is provided with a SAS controller 121 for controlling communication with the host computer 19 and the drive unit 14, and the temperature sensor 2a 122 and the temperature sensor 2b 123 for acquiring temperature information and transmitting the same to the SAS controller 121 via the serial communication I/F. The controller 2 12 further has a PLD 124 for performing emergency communication with the controller 1 11, a memory 125 for storing various information such as temperature information and tables, and a DC/DC converter 126 for converting DC voltage from the power supply 2 16 to a given voltage.

The power supply 2 16 is provided with a microcontroller 2 161 for controlling the whole power supply, and the cooling fan 21 162 and the cooling fan 22 163 having their rotational speed controlled by the microcontroller 2 161 and cooling the interior of the storage subsystem 10. In the interior of the microcontroller 2 161 are provided a memory 1 1611 for setting the rotation speed of the cooling fan 21 162 and the cooling fan 22 163, and a memory 2 1612 for storing the two temperature information acquired from the temperature sensor 2a 122 and the temperature sensor 2b 123. It is also possible to have the rotation speed of the cooling fan 21 162 and the cooling fan 22 163 set in the memory 2 1612.

Further, the SAS controller 111/SAS controller 121 and the microcomputer 1 151/microcomputer 2 161 are connected via a serial I/F such as I2C-I/F, so as to enable communication of data or monitoring of statuses mutually between SAS controllers, microcontrollers, or between the SAS controller and the microcontroller. The configuration also enables the contents of memory 1 and memory 2 in the respective microcomputers to be referred to by the respective SAS controllers in a shared manner.

<I/F Between Controllers>

FIG. 3 is a view illustrating the I/F between controllers. The PLD 114 of the controller 1 11 and the PLD 124 of the controller 2 12 are connected via a port called GPIO (General Purpose I/O), and when failure occurs to a normal communication line connecting the controllers, communication is performed using the GPIO of the PLD 114 and the PLD 124, and the mutual statuses of the controllers are confirmed.

The method for using the GPIO is as follows:

(1) Two lines are respectively used redundantly for OUT and IN, considering failures such as signal line disconnection.

(2) Setting/cancelling of OUT (GPO port: USOUT1/GPIO 67 (GPIO 12_1), USOUT2/GPIO 63 (GPIO 12_2))

1: In a state where the SAS controller 111/121 detects access failure by I2C to power supply 1 15 or power supply 2 16

0: In a state where the storage subsystem 10 detects either an initial value after start, or detects removal of either the controller or the power supply of the other system when "1" is set (3) Meaning of IN (GPI port: USIN1/GPIO 69 (GPIO 21_1), USIN2/GPIO 65 (GPIO 21_2))

1: When the SAS controller of the other system fails to perform I2C access to either the power supply 1 15 or the power supply 2 16, or if the controller of the other system is not installed 0: Other than the above-described state "1"

(4) When performing setting to the GPIO, setting is performed to the two OUT lines.

(5) Reading of the set point signal (for IN) is performed multiple times to confirm that they all correspond. If they do not correspond, the information is stored as log in the SAS controller.

(6) When referring to the GPIO signal (on the IN side), the two lines for IN are referred to, and used for OR determination.

(7) When settling the GPIO value, if "1" is detected as the state of one of the two IN lines two times in a row, it is determined that the state is abnormal, and the cooling fan is set to the maximum rotational speed (Speed 4 described later).

(8) The IN line (GPI) is referred to at the same time interval as the monitoring of the cooling fan (such as a 30-second interval).

By using the GPIO of the PLO as described from (1) to (8), abnormality can be detected in each controller when failure (disconnection etc.) of the I2C-IF line 1111 or 1211 or SAS controller abnormality occurs.

<Fan Rotation Speed Determination Table>

FIG. 4 is a view illustrating a configuration example of a fan rotation speed determination table. The fan rotation speed determination table 40 is a table for determining a set value in the memory 1 1511/1611 to obtain the given rotational speed of the cooling fan, which is stored in the memory 115 and the memory 125. The fan rotation speed determination table 40 includes a number (#) 401, a rotational speed (Speed) setting 402, a memory setting value 403 (value stored in memory 2), and remarks 404.

In order to rotate the cooling fan by "Speed 1", the SAS controller 111/121 refers to a memory setting value 403 corresponding to "Speed 1" in a Speed setting 402 of the fan rotation speed determination table 40, and acquires a setting value "0x80" to memory 1. Similarly, the SAS controller 111/121 acquires a setting value "0x9C" to memory 1 if the Speed setting 402 is "Speed 2", and acquires "0xD9" if the setting is "Speed 4 (MAX)".

The SAS controller 111/121 sets the acquired memory setting value to the memory 1 1511/1611. Based on the value set in the memory 1 1511, the microcontroller 1 151 of the power supply 1 15 rotates the cooling fan 11 152 and the cooling fan 12 153 by the predetermined rotational speed. Similarly, based on the value set in the memory 1 1611, the microcomputer 2 161 of the power supply 2 16 rotates the cooling fan 21 162 and the cooling fan 22 163 by the predetermined rotational speed. Incidentally, the same memory value, such as "0x9C", is stored in the memory 1 1511 and the memory 1 1611, so that the four cooling fans from the cooling fan 11 152 to the cooling fan 22 163 are synchronized and rotated by the same rotational speed.

<State Transition of Fan Rotation Speed>

FIG. 5 is a view showing the state transition of the fan rotation speed (rotational speed). When starting the storage subsystem 10 (when power supply is ON), the state is set to Speed 1 as the initial state. Either the SAS controller 111 or the SAS controller 121 compares the greater one of the two temperature information that the SAS controller 111 has acquired from the temperature sensor 1a 112 and the temperature sensor 1b 113 with the greater one of the two temperature information that the SAS controller 121 has acquired from the temperature sensor 2a 122 and the temperature sensor 2b 123, and the state transition is caused by the greatest temperature information (maximum value). The transition conditions are as follows:

(Sp 1) Transition condition from Speed 1 to Speed 2: When the temperature information becomes equal to or greater than 35° C.

(Sp 2) Transition condition from Speed 2 to Speed 3: When the temperature information becomes equal to or greater than 37° C.

(Sp 3) Transition condition from Speed 3 to Speed 2: When the temperature information becomes equal to or smaller than 33° C.

(Sp 4) Transition condition from Speed 2 to Speed 1: When the temperature information becomes equal to or smaller than 31° C.

In the present embodiment, the cooling fan speed is controlled in four steps, from Speed 1 to Speed 4, but it is also possible to perform control using a greater number of steps. Each time the status is transited (when the temperature information is varied), the SAS controller stores the memory setting value 403 corresponding to the speed in the memory 1 of the power supply, causes the microcontroller 1 151 to read the memory setting value 403 from the memory 1 1511 and the microcomputer 2 161 to read the memory setting value 403 from the memory 1 1611, and changes the rotational speed of cooling fan 11 152/cooling fan 12 153/cooling fan 21 162/cooling fan 22 163 based on the memory setting value.

<State Transition of Controller>

Figure 6:
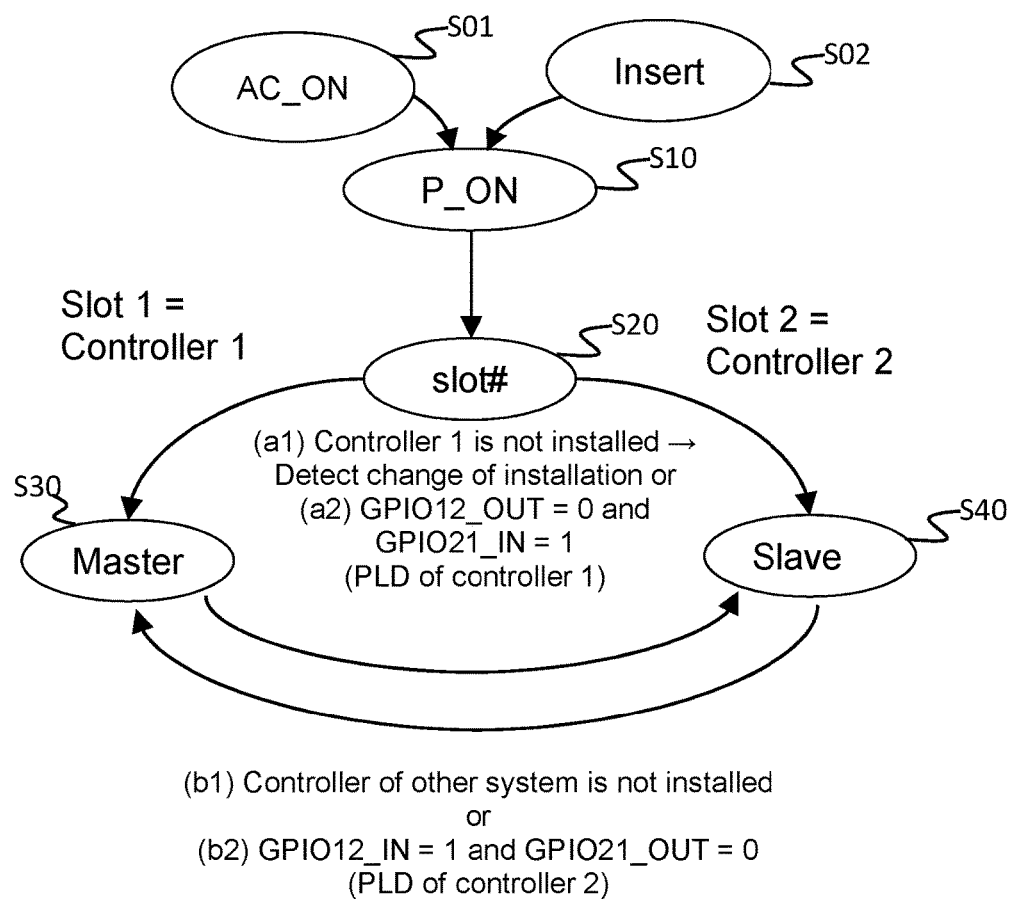
FIG. 6 is a view illustrating a state transition of a controller.

FIG. 6 is a view showing a state transition of the controller. The following six states are the controller state.

(St01) In S (State) 01, AC_ON, that is, connection of an external power supply is detected.

(St02) In S02, insertion of the controller is detected.

(St10) In S10, P_ON (Power_On), that is, the power supply of the storage subsystem 10 or the controller is turned ON.

(St20) In S20, the controller connected to the Slot # is discriminated. The controller connected to Slot 1 is set as "controller 1", and the state is transited to S30. The controller connected to Slot 2 is set as "controller 2", and the state is transited to S40.

(St30) In S30, the controller 1 connected to Slot 1 is set as "Master" or "Master controller". The transition condition from S30 to S40 is as follows:

(a1) In a state where the controller 2 12 in the "Master controller" state detects that the state of controller 1 has changed from "not installed" to "installed", the controller 2 12 becomes the "Slave controller".

OR (a2) In a state where GPIO 12_1/2 (USOUT1/GPIO 67, USOUT2/GPIO 63) of the PLD 114 of the controller 1 11 is "0", and GPIO 21_1/2 (USIN1/GPIO 69, USIN2/GPIO 65) is "1", that is, in a state where the controller 1 11 is "normal" and the controller 2 12 is "abnormal", the controller 2 12 becomes the "Slave controller".

(St40) In S40, the controller 2 12 connected to Slot 2 is set as the "Slave" or "Slave controller". The transition condition from S40 to S30 is as follows:

(b1) In a state where the other controller (controller 1 11) is in a not-installed state, the controller 2 12 becomes the "Master controller".

OR (b2) In a state where GPIO 12_1/2 (USIN1/GPIO 69, USIN2/GPIO 65) of the PLD 124 of the controller 2 12 is "1" and the GPIO 21_OUT_1/2 (USOUT1/GPIO 67, USOUT2/GPIO 63) is "0", that is, in a state where the controller 2 12 is "normal" and the controller 1 11 is "abnormal", the controller 2 12 becomes the "Master controller".

At first, the controller connected to Slot 1 is set as the Master controller, and the other controller is set as the Slave controller. The Master controller stores the temperature information from the temperature sensor and a provisional rotational speed determined by the temperature information to its own memory and memory 2 on the Slave controller side. Similar to the Master controller, the Slave controller also stores the temperature information from the temperature sensor and a provisional rotational speed determined by the temperature information to its own memory and memory 2 on the Master controller side. Thereafter, the Master controller compares the contents of memory 2 on the Master controller side (temperature information and provisional rotational speed) with the contents of memory 2 on the Slave controller side (temperature information or provisional rotational speed). Then, either the rotational speed regarding the highest temperature information or the fastest provisional rotational speed is set as the final rotational speed for actually rotating the FAN 152/153/162/163. When the Master controller fails or if the whole controller is removed from the connected state, the Slave controller becomes the Master controller, and the final rotational speed is determined based on the data stored in the memory, the acquired contents of the set memory, and the temperature information and the provisional rotational speed. By dynamically switching the Master controller (or Master SAS controller) and the Slave controller (or Slave SAS controller) in the above-described manner according to the state of the inner side of the storage subsystem 10, the rotational speed of the cooling fans can be changed even when abnormality is detected.

<Acquisition of Temperature Information/Fan Rotation Speed Control>

Figure 7:
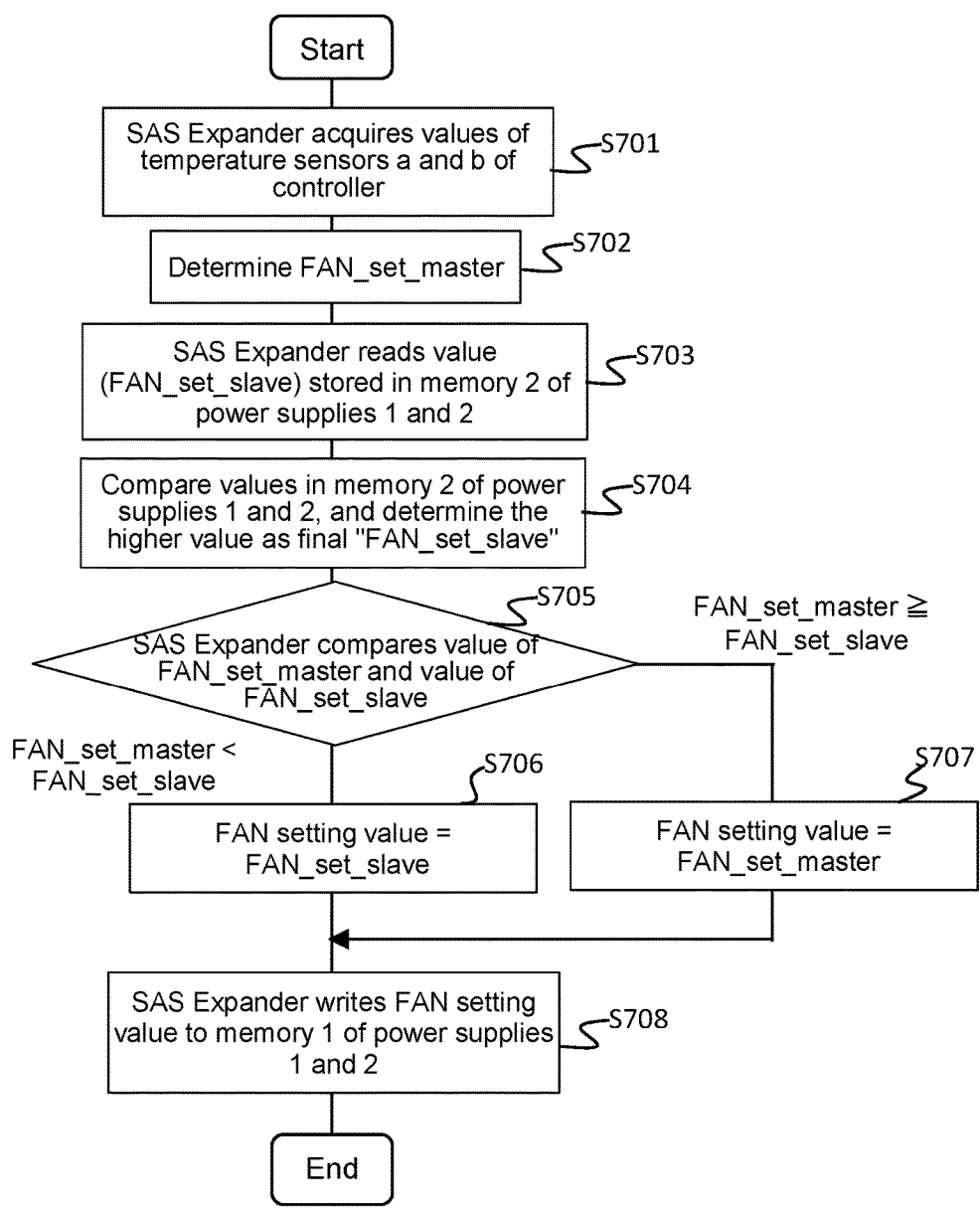
FIG. 7 is a flowchart illustrating a process of acquiring temperature information by the master controller and fan rotation speed determination processing.

FIG. 7 is a flowchart showing the acquisition of temperature information and fan rotation speed determination processing in a Master controller. FIG. 8 is a flowchart showing the process for acquiring the temperature information in a Slave controller. FIGS. 7 and 8 are described assuming that the SAS controller 111 is the master SAS controller and the SAS controller 121 is the slave SAS controller. The present processing is performed once every 30 seconds, for example, to perform effective control of the rotational speed of the cooling fan based on the internal temperature of the storage subsystem 10.

In S701, the SAS controller 111 acquires the value of the temperature sensor 1*a* 112 and the temperature sensor 1*b* 113 of the controller 1 11. The SAS controller 111 stores the acquired temperature information respectively to the memory 2 1512 of the power supply 1 15 and the memory 2 1612 of the power supply 2 16.

In S702, the SAS controller 111 compares the acquired values of the temperature sensor 1*a* 112 and the temperature sensor 1*b* 113, and determines the higher value (temperature information) as the final FAN_set_master. Incidentally, it is also possible to set the final FAN_set_master as the provisional rotational speed of the cooling fans based on the higher temperature information (first provisional rotational speed).

In S703, the SAS controller 111 reads the values (FAN_set_slave) of the temperature information stored respectively in the memory 2 1512 of the power supply 1 15 and the memory 2 1612 in the power supply 2 16. For example, the two temperature information having higher values (final FAN_set_slave) out of the temperature information (FAN_set_slave) that the SAS controller 121 acquires from the temperature sensor 2*a* 122 and the temperature sensor 2*b* 123 are stored in the memory 2 1512/1612. The SAS controller 111 acquires the stored temperature information from the memory 2 1512/1612.

In S704, the SAS controller 111 compares the two temperature information values (FAN_set_slave) being read, and sets the higher value (temperature information) as the final FAN_set_slave. By comparing the temperature information read from the memory 2 1512 and the temperature information read from the memory 2 1612 and confirming that they correspond, the SAS controller 111 can confirm the reliability of the temperature information. The reliability of the temperature information can also be confirmed by comparing the final FAN_set_slave acquired from the respective memories 2.

In S705, the SAS controller 111 compares the value of the final FAN_set_master and the value of the final FAN_set_slave. If the value of the FAN_set_master is equal to or greater than the value of the FAN_set_slave, the SAS controller 111 executes S707, and if the value of the FAN_set_master is smaller than the value of the FAN_set_slave, it executes S706.

In S706, since the maximum value of the temperature information is the value of FAN_set_slave, the SAS controller 111 sets the setting value of the FAN as the FAN_set_slave. In S707, since the maximum value of the temperature information is the value of FAN_set_master, the SAS controller 111 sets the setting value of the FAN as the FAN_set_master. As described earlier, it is also possible to compare the final FAN_set_master and final FAN_set_slave as the provisional rotational speed of the cooling fan, and to determine the final rotational speed.

In S708, the SAS controller 111 writes the FAN setting value (maximum temperature information) determined in S706 or S707 to the memory 1 1511 of the power supply 1 15 and the memory 1 1611 of the power supply 2 16. Further, the SAS controller 111 compares the FAN setting value (maximum temperature information) with the state transition diagram of FIG. 5, and calculates the Speed setting. Then, it compares the obtained Speed setting with the fan rotation speed determination table 40 of FIG. 4 to obtain the memory setting value, and writes the value to the memory 1 1511 of the power supply 1 15 and the memory 1 1611 of the power supply 2 16. Then, the SAS controller 111 and SAS controller 121 end the fan rotation speed determination processing. In the above description, the FAN_set_master and the FAN_set_slave are set as the temperature information, but the state of speed of the cooling fan (illustrated in the state transition diagram of FIG. 5 or the speed setting 402 of FIG. 4) or the memory setting value 403 of FIG. 4 can also be used. Moreover, it is possible to compare the aforementioned first provisional rotational speed (Master side) and the second provisional rotational speed (Slave side) described later by the SAS controller 111, and to set the greater provisional rotational speed as the final rotational speed to the memory 1 1511/1611, so as to control the rotational speed of the cooling FAN.

The microcontroller 1 151 reads the memory setting value from the memory 1 1511, and the microcomputer 2 161 reads the memory setting value from the memory 1 1611. Based on the rotational speed according to the read memory setting value, the microcontroller 1 151 rotates the cooling fan 11 152 and the cooling fan 12 153, and the microcomputer 2 161 rotates the cooling fans 21 162 and the cooling fan 22 163.

In S801, the SAS controller 121 acquires the values of the temperature sensor 2a 122 and temperature sensor 2b 123 of the controller 2 12 at the slave SAS controller side. The SAS controller 111 stores the acquired temperature information to the memory 2 1512 of the power supply 1 15 and the memory 2 1612 of the power supply 2 16, respectively.

In S802, the SAS controller 121 compares the value of the temperature sensor 2a 122 and the value of the temperature sensor 2b 123, and determines the higher value as the final FAN_set_slave. It is also possible to set the final FAN_set_slave as the provisional rotational speed (second provisional rotational speed) of the cooling fan based on the higher temperature information.

In S803, the SAS controller 121 writes the final FAN_set_slave value to the memory 2 1512 of the power supply 1 15 and the memory 72 1612 of the power supply 2 16.

The specific operation will be described, assuming that the temperature information of the temperature sensor 1a 112 is "35 degrees", the temperature information of the temperature sensor 1b 113 is "37 degrees", the temperature information of the temperature sensor 2a 122 is "34 degrees", the temperature information of the temperature sensor 2b 123 is "36 degrees", and that the SAS controller 111 is the master-side SAS controller, and the SAS controller 121 is the slave-side SAS controller.

At first, the slave-side SAS controller 121 compares the temperature information ("34 degrees") of the temperature sensor 2a 122 and the temperature information ("36 degrees") of the temperature sensor 2b 123, and sets the higher value ("36 degrees") as the final FAN_set_slave. Further, the slave-side SAS controller 121 sets the two temperature information as the FAN_set_slave, and stores the same together with the final FAN_set_slave to the memory 2 1512 of the power supply 1 15 and the memory 2 1612 of the power supply 2 16.

The master-side SAS controller 111 compares the temperature information ("35 degrees") of the temperature sensor 1a 112 and the temperature information ("37 degrees") of the temperature sensor 1b 113, and sets the higher value ("37 degrees") as the final FAN_set_master. Further, the master-side SAS controller 111 sets the two temperature information as the FAN_set_master, and stores the same together with the final FAN_set_master to the memory 2 1512 of the power supply 1 15 and the memory 2 1612 of the power supply 2 16.

By this operation, a total of six temperature information, which are the final FAN_set_slave, two FAN_set_slaves, the final FAN_set_master and two FAN_set_masters, are stored to the memory 2 1512 of the power supply 1 15 and the memory 2 1612 of the power supply 2 16.

Next, the master-side SAS controller 111 reads the final FAN_set_slave from the memory 2 1512 of the power supply 1 15 and/or the memory 2 1612 of the power supply 2 16. At this time, it is also possible to obtain the final FAN_set_slave by reading and comparing the two FAN_set_slave values. The mater-side SAS controller 111 compares the final FAN_set_master ("37 degrees") and the final FAN_set_slave ("36 degrees"), and obtains the maximum temperature information.

In the present example, the maximum temperature information is "37 degrees", so that the master-side SAS controller 111 sets "37 degrees" as the FAN setting value, and stores the same in the memory 1 1511 of the power supply 1 15 and the memory 1 1611 of the power supply 2 16. Moreover, since the inner temperature of the storage subsystem 10 is "37 degrees", the master-side SAS controller 111 determines that the rotation speed (rotational speed) of the cooling fan should be set to "Speed 3" based on the state transition of FIG. 5. If the speed setting 402 is "Speed 3" based on the fan rotation speed determination table 40 of FIG. 4, the memory setting value 403 will be "0xBA", so that the master-side SAS controller 111 stores this memory value "0xBA" to the memory 1 1511 of the power supply 1 15 and the memory 1 1611 of the power supply 2 16.

The microcontroller 1 151 reads the memory setting value from the memory 1 1511 and the microcomputer 2 161 reads the memory setting value from the memory 1 1611, and rotates the cooling fans 11 152 through 22 163 in synchronization based on the rotational speed determined by the memory setting value.

By the process described above, the temperature information of two or more temperature sensors provided to two or more controllers can be acquired by the SAS controller or the processor such as a CPU not shown, and the maximum temperature information is extracted. The two or more cooling fans being provided are rotated by the rotational speed determined based on the maximum temperature information. Thereby, a sufficient cooling effect can be obtained without depending on the state of installation of HDDs and SSDs. Further, HDDs and SSDs are illustrated as the storage media of the present embodiment, but the present invention is not restricted to such storage media, and DVD-RW, CD-RW, IC cards, SD cards and the like can be used to achieve a sufficient cooling effect, regardless of the state of installation of the storage media.

In the above description, an example has been described where the information on the rotational speed of the FAN is set in the memory 1 1511/1611 and the temperature information is set in the memory 2 1512/1612. However, it is also possible to store the provisional rotational speed of the FAN based on the temperature information of each controller to the memory 2 1512 and the memory 2 1612, respectively, and have the master-side SAS controller compare the provisional rotational speed of the FAN of the slave-side SAS controller and the provisional rotational speed of its own SAS controller, and set the greater provisional rotational speed of the FAN as the final rotational speed of the FAN to the memory 1 1511/1611 control the rotational speed of the cooling fan. Even further, it is possible to set the memory 1 1511 and the memory 2 1512 as one memory, and further set the memory 1 1611 and the memory 2 1612 as one memory, divide each memory into four areas, and store the acquired temperature information in the first area, the provisional rotational speed of the FAN in the second area, the highest temperature information (maximum temperature information) of the acquired temperature information in the third area, and the final rotational speed of the FAN in the fourth area. By adopting such configuration, it is possible to reduce the number of components. The final rotational speed of the FAN can also be determined based on the provisional rotational speed of the FAN in the second area and the maximum temperature information in the third area.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of an embodiment can be replaced with the configuration of another embodiment, or the configuration of a certain embodiment can be added to the configuration of another embodiment. Moreover, a portion or all of the configurations of each embodiment can be added to, deleted from or replaced with other configurations. The configurations and functions described above can be realized through software by having a processor interpret and execute programs for realizing the respective functions.

The information such as the programs, tables and files for realizing the respective functions can be stored in a storage device such as a memory, a hard disk or an SSD (Solid State Drive), or in a memory media such as an IC card, an SD card or a DVD. Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST

10: Storage Subsystem
11/12: Controller
13: Disk Unit
15/16: Power Supply
19: Host Computer
40: Fan Rotation Speed Determination Table
111/121: SAS Controller
112/113/122/123: Temperature Sensor
152/153/162/163: Cooling Fan
1511/1512/1611/1612: Memory

The invention claimed is:

1. A storage subsystem comprising:
a first controller having a first temperature sensor and a second temperature sensor;
a first power supply having a first memory, a second memory, and a first FAN;
a second controller having a third temperature sensor and a fourth temperature sensor;
a second power supply having a third memory, a fourth memory, and a second FAN; and
multiple storage media;
wherein the storage subsystem is equipped with the multiple storage media from a front side to a rear side direction of the storage subsystem, and the first controller and the second controller are mounted in parallel behind the multiple storage media;
the first FAN and the second FAN are provided to the rear side of the storage subsystem such that heat generated at the storage subsystem is discharged from the rear side of the storage subsystem;
the first controller sets a higher temperature of the temperatures measured via the first temperature sensor and the second temperature sensor as a first temperature information,
the second controller sets a higher temperature of the temperatures measured via the third temperature sensor and the fourth temperature sensor as a second temperature information, and
the first controller or the second controller determines a rotational speed of the FAN based on the temperature information with larger value among the first temperature information and the second temperature information, and rotates the first FAN and the second FAN at the determined rotational speed of the FAN.

2. The storage subsystem according to claim 1, wherein one out of the first controller and the second controller is defined as a master controller and the other is defined as a slave controller, and
the master controller determines the rotational speed of the FAN.

3. The storage subsystem according to claim 2, wherein in a case where the first controller is in an abnormal state or the first controller is not installed to the storage subsystem, the second controller becomes the master controller, and the second controller determines the rotational speed of the FAN.

4. The storage subsystem according to claim 2, wherein the first controller determines a first rotational speed of the first FAN and the second FAN based on the first temperature information,
the second controller determines a second rotational speed of the first FAN and the second FAN based on the second temperature information, and
the master controller determines the higher rotational speed of the first rotational speed and the second rotational speed as the rotational speed of the FAN.

5. The storage subsystem according to claim 2, wherein the first power supply has a first control microcontroller which controls the rotational speed of the first FAN based on a value stored in the first memory,
the second power supply has a second control microcontroller which controls the rotational speed of the second FAN based on a value stored in the third memory, and
the master controller stores a set value corresponding to the rotational speed of the FAN to the first memory and the third memory, after determining the rotational speed of the FAN.

6. The storage subsystem according to claim 2, wherein the second controller stores the second temperature information to the second memory and the fourth memory, and
when the first controller is defined as the master controller, the first controller reads the second temperature information from the second memory, and determines the rotational speed of the FAN based on the temperature information with larger value among the first temperature information and the second temperature information read from the second memory.

7. A method for optimizing FAN control of a storage subsystem, the storage subsystem comprising:
a first temperature sensor and a second temperature sensor, a first memory and a second memory, a first control unit having a first controller and a first power supply, and a first FAN;
a third temperature sensor and a fourth temperature sensor, a third memory and a fourth memory, a second control unit having a second controller and a second power supply, and a second FAN; and
multiple storage media;
the storage subsystem is equipped with the multiple storage media from a front side to a rear side direction of the storage subsystem, and the first control unit and the second control unit are mounted in parallel behind the multiple storage media;
the first FAN is provided to the rear side of the first control unit such that heat generated at the storage subsystem is discharged from the rear side of the storage subsystem; and
the second FAN is provided to the rear side of the second control unit such that heat generated at the storage subsystem is discharged from the rear side of the storage subsystem;
wherein the method comprises the steps of:
determining a higher temperature of the temperatures measured via the first temperature sensors and the second temperature sensor as a first temperature information by the first controller;
determining a higher temperature of the temperatures measured via the third temperature sensor and the fourth temperature sensor as a second temperature information by the second controller; and
determining a rotational speed of the FAN based on the temperature information with larger value among the first temperature information and the second temperature information, and rotating the first FAN and the second FAN at the determined rotational speed of the FAN, by the first controller or the second controller.

* * * * *